(12) United States Patent
Erbes et al.

(10) Patent No.: US 6,438,192 B1
(45) Date of Patent: Aug. 20, 2002

(54) JET PUMP SLIP JOINT SEAL

(75) Inventors: John Geddes Erbes, Moutain View; Mark Olaf Lenz; Sampath Ranganath, both of San Jose, all of CA (US)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 09/699,910

(22) Filed: Oct. 30, 2000

(51) Int. Cl.[7] ............................. G21C 19/28; F16J 15/34
(52) U.S. Cl. ..................... 376/372; 376/407; 376/260; 277/379
(58) Field of Search ............................... 376/372, 407, 376/260; 277/379, 384, 616, 385, 637

(56) References Cited

U.S. PATENT DOCUMENTS

| | | | | |
|---|---|---|---|---|
| 3,838,002 A | * | 9/1974 | Gluntz et al. | 376/407 |
| 4,285,770 A | * | 8/1981 | Chi et al. | 376/203 |
| 4,468,172 A | * | 8/1984 | Dixon et al. | 239/578 |
| 5,978,433 A | | 11/1999 | Erbes et al. | 376/372 |
| 6,052,425 A | | 4/2000 | Erbes et al. | 376/260 |
| 6,264,203 B1 | * | 7/2001 | Weems et al. | 277/314 |

FOREIGN PATENT DOCUMENTS

JP    JP 08-271673    * 10/1996 ................. 376/407

* cited by examiner

*Primary Examiner*—Michael J. Carone
*Assistant Examiner*—Daniel Matz
(74) *Attorney, Agent, or Firm*—Armstrong Teasdale LLP

(57) ABSTRACT

A seal apparatus for a jet pump slip joint in a boiling water nuclear reactor pressure vessel, in an exemplary embodiment, includes a split seal ring and a segmented diaphragm spring engaging the split seal ring at an inner circumference of the diaphragm spring. The diaphragm spring includes a plurality of latch assemblies spaced circumferentially around an outer circumference. A plurality of slots, spaced circumferentially around the inner circumference, extend from the inner circumference to the support portion. Each latch assembly includes a latch bolt extending through and threadendly engaging a corresponding latch bolt opening in the diaphragm spring. Each latch bolt includes a head and a plurality of ratchet teeth spaced around the periphery of the latch bolt head. A locking spring is positioned to engage the ratchet teeth of the latch bolt head. The latch assembly further includes a latch arm coupled to the latch bolt. The latch arm includes a slot sized to receive a diffuser guide ear.

20 Claims, 4 Drawing Sheets

JET PUMP SLIP JOINT SEAL

BACKGROUND OF THE INVENTION

This invention relates generally to nuclear reactors, and more particularly to jet pump slip joint seal apparatus for boiling water nuclear reactors.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

In a BWR, hollow tubular jet pumps positioned within the shroud annulus, provide the required reactor core water flow. The upper portion of the jet pump, known as the inlet mixer, is laterally positioned and supported against two opposing rigid contacts within restrainer brackets by a gravity actuated wedge. The restrainer brackets support the inlet mixer by attaching to the adjacent jet pump riser pipe. The lower portion of the jet pump, known as the diffuser, is coupled to the inlet mixer by a slip joint. The slip joint between the jet pump inlet mixer and the jet pump diffuser collar has about 0.015 inch diametral operating clearance which accommodates the relative axial thermal expansion movement between the upper and lower parts of the jet pump and permits leakage flow from the driving pressure inside the pump.

Excessive leakage flow can cause oscillating motion in the slip joint, which is a source of detrimental vibration excitation in the jet pump assembly. The slip joint leakage rate can increase due to single loop operation, increased core flow, or jet pump crud deposition. The restrainer bracket laterally supports the inlet mixer through three point contact provided by two set screws and the inlet mixer wedge at an elevation above the slip joint. Set screw gaps can occur during plant operation. Sometimes, the inlet mixer appears to settle to a position away from the set screw, while in other cases, wear occurs between the mixer wedge and the restrainer pad both cases, three point contact is lost and the potential for vibration is significantly increased. Set screw gaps are affected by the difference in thermal and pressure displacements of the shroud, pressure vessel, and rotation of the shroud support plate. In addition to affecting set screw gaps, thermal and pressure displacements of the shroud and the pressure vessel can diminish alignment interaction loads in the jet pump assembly which are beneficial in restraining vibration, such as a lateral force in the slip joint. The resultant increased vibration levels and corresponding vibration loads on the piping and supports can cause jet pump component degradation from wear and fatigue.

High levels of flow induced vibration (FIV) is possible in some jet pump designs at some abnormal operational conditions having increased leakage rates. A labyrinth seal that includes a plurality of circumferential grooves can be added to the exit end of the inlet mixer at the slip joint interface for a new plant design. However, such a modification may be impractical to perform in an operating plant.

It is desirable to provide a jet pump assembly that has a reduced amount of leakage through the slip joint to eliminate high level FIV.

BRIEF SUMMARY OF THE INVENTION

There is therefore provided, in one embodiment of the present invention, a seal apparatus for a jet pump slip joint in a boiling water nuclear reactor pressure vessel. The seal apparatus includes a split seal ring and a segmented diaphragm spring engaging the split seal ring at an inner circumference of the diaphragm spring.

The diaphragm spring includes a plurality of latch assemblies spaced circumferentially around an outer circumference, with each latch assembly configured to engage a diffuser guide ear. A seal ring engagement portion depends from the diaphragm spring and extends around the inner circumference. The seal engagement portion is configured to engage the seal ring. A support portion depends from the diaphragm spring and extends around the outer circumference. A plurality of slots extend from the inner circumference to the support portion of the diaphragm spring. The slots are spaced circumferentially around the inner circumference.

Each latch assembly includes a latch bolt extending through a corresponding latch bolt opening in the support portion of the diaphragm spring. Each latch bolt includes a head and a plurality of ratchet teeth spaced around the periphery of the latch bolt head. A locking spring is coupled to the diaphragm spring. The locking spring is positioned adjacent the latch bolt and configured to engage the ratchet teeth of the latch bolt head. The latch assembly further includes a latch arm having a threaded latch bolt opening. The latch bolt extends through and threadedly engages the latch bolt opening. The latch arm includes a slot sized to receive a diffuser guide ear.

The seal apparatus is installed on the slip joint by positioning the split ring seal and the diaphragm spring on the end of the diffuser with a spring slot engaging each of the diffuser guide ears. The latch bolt of each latch assembly is tightened so that the latch arm swings into position and engages a corresponding guide ear. The inlet mixer is installed through the split ring seal and diaphragm spring and into the diffuser to form the slip joint. The latch bolt is tightened further to capture the latch arm slot against the guide ear to engage the seal ring with the seal engagement portion of the diaphragm spring. The latch bolt is locked in place by the locking spring engaging the ratchet teeth of the clamp bolt head.

The above described seal apparatus restricts leakage flow between the inlet mixer and the diffuser at the slip joint to prevent oscillating motion and to eliminate high level flow induced vibration. Additionally, the wedging action of the seal in the slip joint opening provides a rigid resistance to oscillating motion.

DETAILED DESCRIPTION OF THE INVENTION

Figure 1:
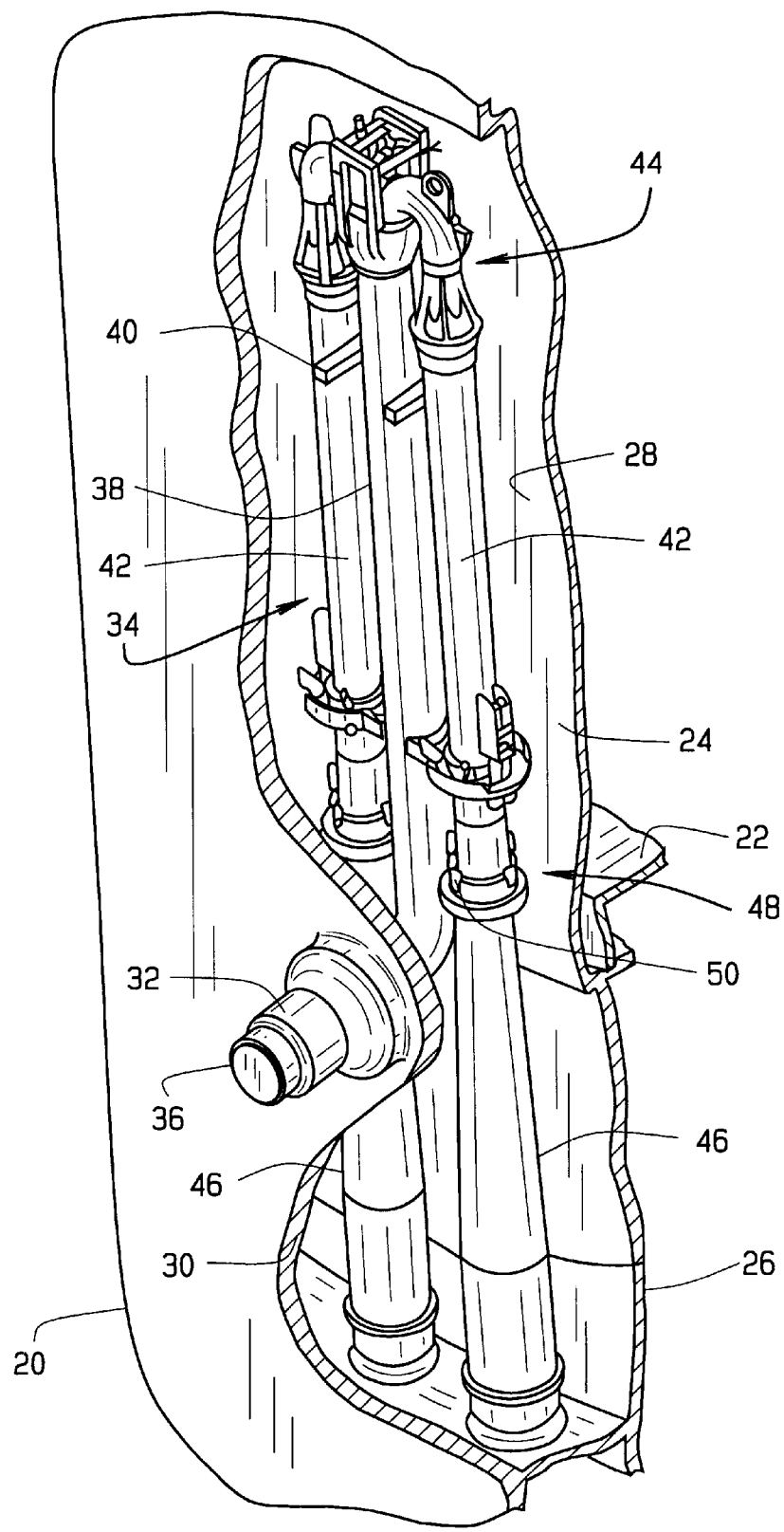
FIG. 1 is schematic, partial sectional view, with parts cut away, of a reactor pressure vessel of a boiling water nuclear reactor.

FIG. 1 is a schematic, partial sectional view, with parts cut-away, of a reactor pressure vessel (RPV) 20 for a boiling water reactor. RPV 20 has a generally cylindrical shape and is closed at one end by a bottom head and at its other end by removable top head (not shown). A top guide (not shown) is spaced above a core plate 22 within RPV 20. A shroud 24 surrounds core plate 22 and is supported by a shroud support structure 26. An annulus 28 is formed between shroud 24 and side wall 30 of RPV 20.

An inlet nozzle 32 extends through side wall 30 of RPV 20 and is coupled to a jet pump assembly 34. Jet pump assembly 34 includes a thermal sleeve 36 which extends through nozzle 32, a lower elbow (only partially visible in FIG. 1), and a riser pipe 38. Riser pipe 38 extends between and substantially parallel to shroud 24 and RPV side wall 30. A riser brace 40 stabilizes riser pipe 38 within RPV 20.

Jet pump assembly 34 also includes inlet mixers 42 connected to riser pipe 38 by transition assembly 44. Inlet mixers 42 are coupled to corresponding diffusers 46 by slip joints 48. Each diffuser 46 includes four guide ears 50 equally spaced around diffuser 46 at slip joint 48.

Figure 2:
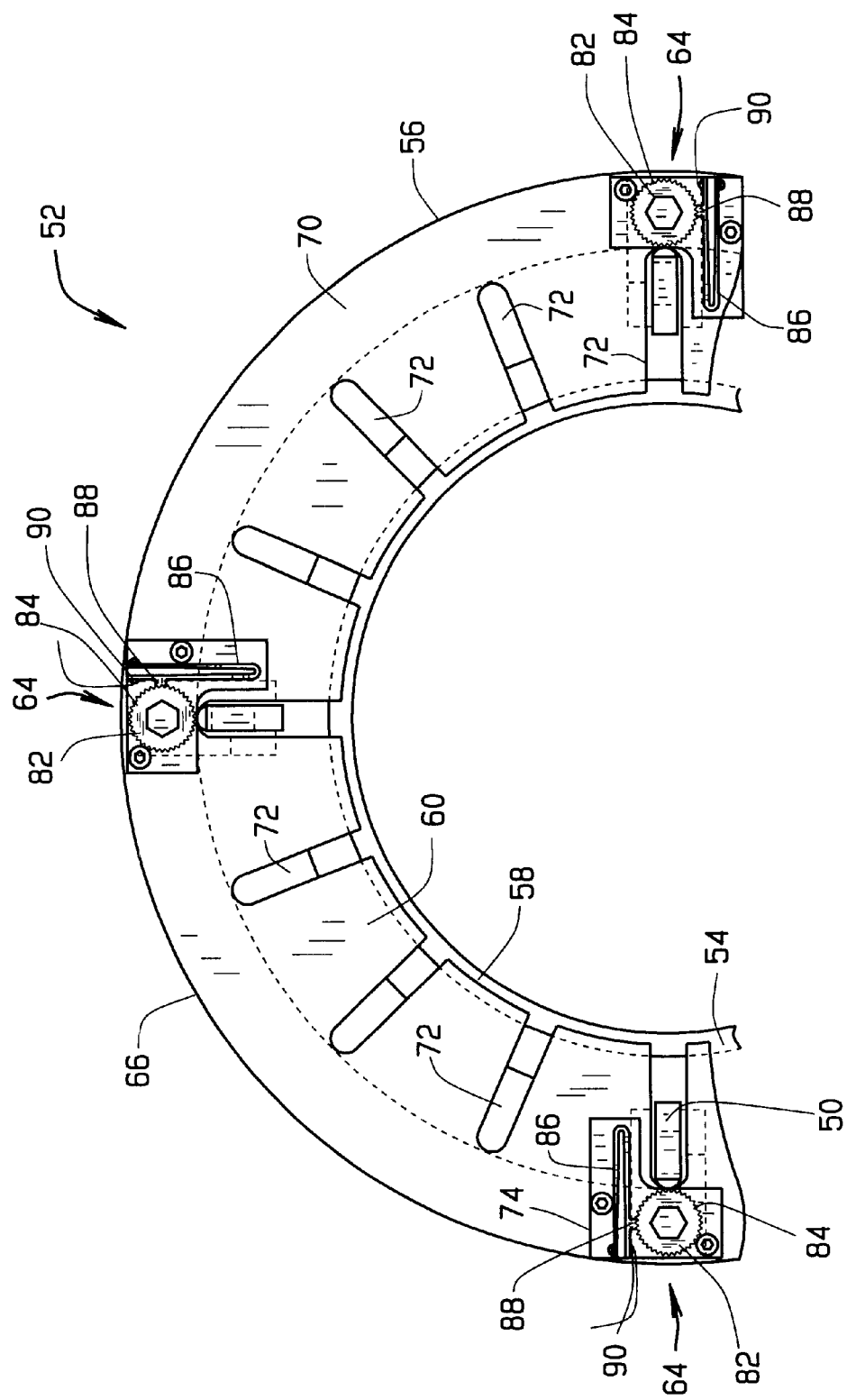
FIG. 2 is a top sectional view of a jet pump shown in FIG. 1 with a seal assembly attached in accordance with an embodiment of the present invention.
Figure 3:
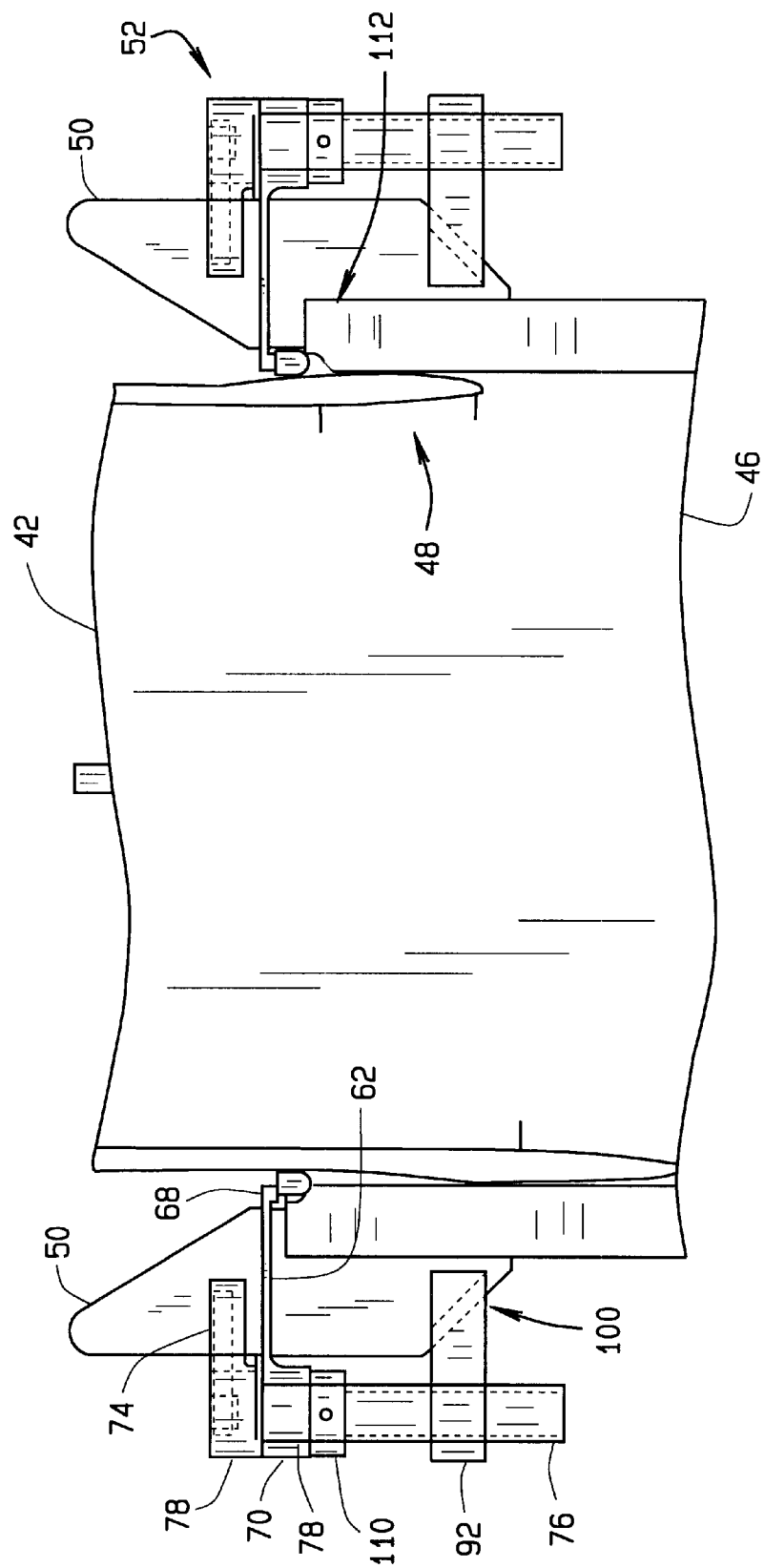
FIG. 3 is a front sectional view of the jet pump and seal assembly shown in FIG. 2.

FIG. 2 is a top sectional view of jet pump 34 with a seal assembly 52 attached in accordance with an embodiment of the present invention. FIG. 3 is a front sectional view of jet pump 34 and seal assembly 52. Referring to FIGS. 1 and 2, seal apparatus 52 includes a split seal ring 54 and a segmented diaphragm spring 56 engaging split seal ring 54 at an inner circumference 58 of diaphragm spring 56.

Diaphragm spring 56 has a first surface 60 and a second surface 62, and includes a plurality of latch assemblies 64 spaced circumferentially around an outer circumference 66, with each latch assembly 64 configured to engage a diffuser guide ear 50. A seal ring engagement portion 68 depends from second surface 62 of diaphragm spring 56 and extends around inner circumference 58. Seal engagement portion 68 is configured to engage seal ring 54. A support portion 70 depends from second surface 62 of diaphragm spring 56 and extends around outer circumference 66. A plurality of slots 72 extend from inner circumference 58 to support portion 70 of diaphragm spring 56. Slots 72 are spaced circumferentially around inner circumference 58.

Each latch assembly 64 includes a substantially L-shaped latch block 74 coupled to first surface 60 of diaphragm spring 56, and a latch bolt 76. An opening 78 extends through upper latch block 74. Latch bolt 76 extends through opening 78 and extends through a corresponding latch bolt opening 80 in support portion 70 of diaphragm spring 56. Each latch bolt 76 includes a head 82 and a plurality of ratchet teeth 84 spaced around a periphery of latch bolt head 82. A locking spring 86 is coupled to upper latch block 74 adjacent opening 78. A retention stub 88 extends from one side of locking spring 86. Retention stub 88 is sized to engage ratchet teeth 84 to lock latch bolt 76 in place and prevent latch bolt 76 from loosening. Upper latch block 74 also includes a release opening 90 located adjacent locking spring 86.

Release opening 90 is sized to receive a release tool (not shown) which moves locking spring 86 to disengage retention stub 88 from ratchet teeth 84 to enable latch bolt 76 to be loosened.

Figure 4:
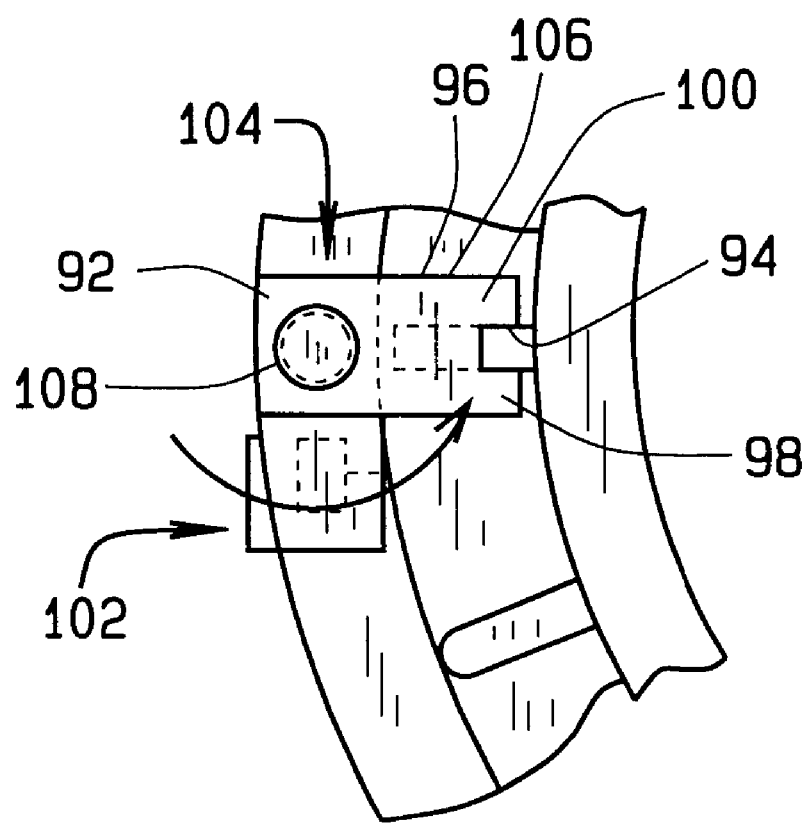
FIG. 4 is a bottom sectional view of a latch arm of a seal assembly shown in FIG. 2 with the latch arm in disengaged and engaged positions.

Referring also to FIG. 4, latch assembly 64 further includes a latch arm 92 coupled to latch bolt 76. Latch arm 92 includes a slot 94 sized to receive a diffuser guide ear 50. Latch arm 92 includes a first engagement finger 96 and a second engagement finger 98 on opposite sides of slot 94. First engagement finger 96 includes an angled end portion 100 to permit latch arm 92 to swing from an open position 102 to a closed or engaged position 104 without guide ear 50 interfering with first engagement finger 96 by contacting an outer surface 106 of first engagement finger 96. A threaded latch bolt opening 108 extends through latch arm 92. Latch bolt 76 extends through and threadedly engages opening 108. A bolt retention collar 110 is attached to latch bolt 76 to retain latch bolt 76 in latch bolt opening 80 in support portion 70 of diaphragm spring 56.

Seal apparatus 52 is installed on slip joint 48 by positioning split ring seal 54 and diaphragm spring 56 on an end 112 of diffuser 46 with a spring slot 72 engaging each diffuser guide ear 50. Latch bolt 76 of each latch assembly 64 is tightened so that latch arms 92 swing into position and engage a corresponding guide ear 50. Inlet mixer 42 is installed through split ring seal 54 and diaphragm spring 56 and into diffuser 46 to form slip joint 48. Latch bolt 76 is tightened further to capture the latch arm slot 94 against guide ear 50 to engage seal engagement portion 68 of diaphragm spring 56 with seal ring 54. An elastic deflection of diaphragm spring 56 maintains a sealing force on ring seal 54 while accommodating the minor thermal differential changes in component dimensions during operation of the reactor. Latch bolt 76 is locked in place by locking spring 86 engaging ratchet teeth 84 of clamp bolt head 82.

The above described seal apparatus 52 restricts leakage flow between inlet mixer 42 and diffuser 46 at slip joint 48 to prevent oscillating motion and to eliminate high level flow induced vibration. Additionally, the wedging action of seal 54 in the slip joint opening provides a rigid resistance to oscillating motion.

While the invention has been described in terms of various specific embodiments, those skilled in the art will recognize that the invention can be practiced with modification within the spirit and scope of the claims.

What is claimed is:

1. A seal apparatus for a jet pump slip joint in a boiling water nuclear reactor pressure vessel, the jet pump comprising a jet pump inlet mixer and a jet pump diffuser joined by a slip joint, the diffuser comprising a plurality of guide ears spaced circumferentially around the diffuser, said seal apparatus comprising:

a split seal ring; and a segmented diaphragm spring having a first side, a second side, an inner circumference, and an outer circumference, said diaphragm spring engaging said split seal ring at said inner circumference of said diaphragm spring, said diaphragm spring comprising a plurality of latch assemblies spaced circumferentially around said outer circumference, each said latch assembly configured to engage a diffuser guide ear.

2. A seal apparatus in accordance with claim 1 wherein said diaphragm spring further comprises:

a seal ring engagement portion depending from said second surface and extending around said inner circumference, said seal engagement portion configured to engage said seal ring;

a support portion depending from said second surface and extending around said outer circumference, said plurality of latch assemblies coupled to said support portion; and a plurality of slots extending from said inner circumference to said support portion, said slots spaced circumferentially around said inner circumference.

3. A seal apparatus in accordance with claim 1 wherein each said latch assembly comprises a latch bolt and said diaphragm spring comprises a plurality of latch bolt openings, each said latch bolt extending through a corresponding latch bolt opening.

4. A seal apparatus in accordance with claim 3 wherein said latch bolt comprises a head and a plurality of ratchet teeth spaced around the periphery of said latch bolt head.

5. A seal apparatus in accordance with claim 4 wherein said diaphragm spring further comprises a locking spring coupled to said first surface of said diaphragm spring, said locking spring engaging said ratchet teeth of said latch bolt.

6. A seal apparatus in accordance with claim 3 wherein said latch assembly further comprises at latch arm, said latch arm comprising a threaded latch bolt opening, said latch bolt extending through and threadedly engaging said latch bolt opening, said latch arm configured to engage a diffuser guide ear.

7. A seal apparatus in accordance with claim 6 wherein said latch arm comprises a slot sized to receive a diffuser guide ear.

8. A jet pump for a boiling water nuclear reactor, said jet pump comprising:
   an inlet mixer;
   a diffuser coupled to said inlet mixer by a slip joint, the diffuser comprising a plurality of guide ears spaced circumferentially around the diffuser; and
   a seal apparatus comprising a split seal ring, and a segmented diaphragm spring having a first side, a second side, an inner circumference, and an outer circumference, said diaphragm spring engaging said split seal ring at said inner circumference of said diaphragm spring, said diaphragm spring comprising a plurality of latch assemblies spaced circumferentially around said outer circumference, each said latch assembly configured to engage a diffuser guide ear.

9. A jet pump in accordance with claim 8 wherein said diaphragm spring further comprises:
   a seal ring engagement portion depending from said second surface and extending around said inner circumference, said seal engagement portion configured to engage said seal ring;
   a support portion depending from said second surface and extending around said outer circumference, said plurality of latch assemblies coupled to said support portion; and
   a plurality of slots extending from said inner circumference to said support portion, said slots spaced circumferentially around said inner circumference.

10. A jet pump in accordance with claim 8 wherein each said latch assembly comprises a latch bolt and said diaphragm spring comprises a plurality of threaded latch bolt openings, each said latch bolt extending through a corresponding latch bolt opening.

11. A jet pump in accordance with claim 10 wherein said latch bolt comprises a head and a plurality of ratchet teeth spaced around the periphery of said latch bolt head.

12. A jet pump in accordance with claim 11 wherein said diaphragm spring further comprises a locking spring coupled to said first surface of said diaphragm spring, said locking spring engaging said ratchet teeth of said latch bolt.

13. A jet pump in accordance with claim 10 wherein said latch assembly further comprises a latch arm, said latch arm comprising a threaded latch bolt opening, said latch bolt extending through and threadedly engaging said latch bolt opening, said latch arm configured to engage a diffuser guide ear.

14. A jet pump in accordance with claim 13 wherein said latch arm comprises a slot sized to receive a diffuser guide ear.

15. A method of repairing a jet pump slip joint, the jet pump comprising a jet pump inlet mixer and a jet pump diffuser joined by a slip joint, the diffuser comprising a plurality of guide ears spaced circumferentially around a first end of the diffuser, said method comprising the steps of:
   coupling a seal apparatus to the slip joint, the seal apparatus comprising a split seal ring and a segmented diaphragm spring having a first side, a second side, an inner circumference, and an outer circumference, said diaphragm spring configured to engage the split seal ring at the inner circumference of the diaphragm spring, the diaphragm spring comprising a plurality of latch assemblies spaced circumferentially around the outer circumference, each latch assembly configured to engage a diffuser guide ear.

16. A method in accordance with claim 15 wherein the diaphragm spring further comprises a seal ring engagement portion depending from the second surface and extending around the inner circumference, the seal engagement portion configured to engage the seal ring, a support portion depending from the second surface and extending around the outer circumference, the plurality of latch assemblies coupled to the support portion, and a plurality of slots extending from the inner circumference to the support portion, the slots spaced circumferentially around the inner circumference, and coupling a seal apparatus to the slip joint comprises the steps of:
   positioning the split ring seal on the first end of the diffuser; and
   positioning the diaphragm spring on the first end of the diffuser with a spring slot engaging each of the diffuser guide ears.

17. A method in accordance with claim 16 wherein each latch assembly comprises a latch bolt and the diaphragm spring comprises a plurality of threaded latch bolt openings, each latch bolt extending through a corresponding latch bolt opening, the latch bolt comprising a head and a plurality of ratchet teeth spaced around the periphery of the latch bolt head.

18. A method in accordance with claim 17 wherein the latch assembly further comprises a latch arm, the latch arm comprising a threaded latch bolt opening, the latch bolt extending through and threadedly engaging the threaded latch bolt opening, the latch arm further comprising a slot sized to receive a diffuser guide ear, and coupling a seal apparatus to the slip joint further comprises the steps of:
   tightening the latch bolt of each latch assembly so that latch arms swing into position and engage a corresponding guide ear;
   installing the inlet mixer through the split ring seal and diaphragm spring and into the diffuser to form the slip joint;
   tightening the latch bolt further to capture the latch arm slot against the guide ear to engage the seal ring with the seal engagement portion of the diaphragm spring; and
   locking the latch bolt.

19. A method in accordance with claim 18 wherein the diaphragm spring further comprises a locking spring coupled to the first surface of the diaphragm spring, the locking spring configured to engage the ratchet teeth of the latch bolt, and locking the latch bolt comprises the step of engaging the ratchet teeth of the clamp bolt head with the locking spring.

20. A method in accordance with claim 15 further comprising the step of disassembling the inlet mixer from the diffuser prior to coupling the seal apparatus to the slip joint.

* * * * *